(12) United States Patent
Frey, Jr.

(10) Patent No.: US 7,489,351 B2
(45) Date of Patent: Feb. 10, 2009

(54) DYNAMIC RANGE EXTENSION FOR FOCAL PLANE ARRAYS

(75) Inventor: Robert D. Frey, Jr., Bolton, MA (US)

(73) Assignee: BAE Systems Information And Electronic Systems Integration Inc., Nashua, NH (US)

( * ) Notice: Subject to any disclaimer, the term of this patent is extended or adjusted under 35 U.S.C. 154(b) by 647 days.

(21) Appl. No.: 11/038,167

(22) Filed: Jan. 21, 2005

(65) Prior Publication Data

US 2006/0164530 A1    Jul. 27, 2006

(51) Int. Cl.
  *H04N 3/14* (2006.01)
  *H01L 31/062* (2006.01)
  *H01L 27/00* (2006.01)

(52) U.S. Cl. .................. 348/294; 348/308; 257/291; 250/208.1

(58) Field of Classification Search .......... 348/294, 348/308, 298, 297; 250/208.1; 257/291
See application file for complete search history.

(56) References Cited

U.S. PATENT DOCUMENTS

| 4,679,215 | A | * | 7/1987 | Nielsen et al. ............ 348/311 |
| 5,055,667 | A | | 10/1991 | Sayag |
| 5,128,534 | A | * | 7/1992 | Wyles et al. ............. 250/208.1 |
| 5,146,302 | A | * | 9/1992 | Kumada ................... 257/225 |
| 5,382,977 | A | | 1/1995 | Kozlowski et al. |
| 6,064,431 | A | | 5/2000 | Ueno |
| 6,417,503 | B1 | * | 7/2002 | Tsuruta ................... 250/214 A |
| 6,504,141 | B1 | | 1/2003 | Kozlowski et al. |
| 6,660,989 | B2 | * | 12/2003 | Guo et al. ................ 348/308 |
| 6,667,769 | B2 | * | 12/2003 | Harton et al. ............. 348/308 |
| 6,760,070 | B1 | * | 7/2004 | Merrill et al. ............ 348/294 |
| 2002/0113887 | A1 | * | 8/2002 | Iimura et al. ............ 348/310 |

* cited by examiner

*Primary Examiner*—Nhan T Tran
(74) *Attorney, Agent, or Firm*—Oliff & Berridge, PLC; Ronald R. Snider

(57) ABSTRACT

An optical detector uses an auxiliary integrating capacitor is used to determine the optical flux rate when the charge on the well capacitor approaches or reaches linear saturation. The voltage across the primary linearly operating integrating well capacitor is monitored to detect its linear saturation. The auxiliary capacitor charges at a predetermined rate from the start of the integration interval, and the voltage across it is sampled when the monitored voltage across the primary linear integrating well capacitor reaches linear saturation. The voltage across the auxiliary capacitor at this point is function of the rate at which the primary well capacitor was filling, and this voltage is processed as the illumination level for the integration period.

14 Claims, 5 Drawing Sheets

DYNAMIC RANGE EXTENSION FOR FOCAL PLANE ARRAYS

BACKGROUND OF THE INVENTION

1. Field of the Invention

This invention relates to a system and method for extending the dynamic range of an optical sensor, and more particularly to extending the dynamic range of an integrated circuit optical sensor of the type used in a Focal Plane Array (FPA).

2. Description of the Prior Art

A widely use prior art optical sensor is illustrated schematically in FIG. 1. It uses an optical to electrical converter, such as a photodiode 1, to generate a current proportional to the photon flux. A capacitor 3, serving as a linear integration well, collects this charge over a predetermined time interval established by a switch 4 operated by an integration control signal. The voltage across this integrating capacitor at the end of the interval is a function of the average intensity of illumination of the photodiode over the interval. A sample and hold circuit 5 samples the voltage at the end of the interval, and, in a typical system, an analog to digital converter 6 converts this analog voltage to a digital signal an transfers this digital signal to a processor 7. After each sample, the integrating capacitor is discharged, and the process is repeated. As will be appreciated by those skilled in the art, this technology is used in integrated circuit Focal Plane Arrays which use a plurality of these elements to make a two dimensional array of detectors from which an image is generated by the processor. While generally satisfactory, such arrays have limited dynamic range as a result of the necessarily limited size of the linear integrating capacitor in an integrated circuit implementation. This in turn limits the dynamic range of the array.

In certain applications a large dynamic range is required. For example, both bright and dim objects of interest may be present in the field of view or a moving object of interest may have both bright and dim portions.

SUMMARY OF THE INVENTION

An object of this invention is the provision of an integrated circuit optical sensor with a dynamic range extended beyond the range afforded by the primary integrator.

Briefly, this invention contemplates the provision of optical detector in which an auxiliary integrating capacitor is used to determine the optical flux rate when the charge on the well capacitor approaches or reaches linear saturation. The voltage across the primary linearly operating integrating well capacitor is monitored to detect its linear saturation. The second capacitor charges at a predetermined rate from the start of the integration interval, and the voltage across it is sampled when the monitored voltage across the primary linear integrating well capacitor reaches linear saturation. The voltage across the auxiliary capacitor at this point is function of the rate at which the primary well capacitor was filling, and this voltage is processed as the illumination level for the integration period.

DETAILED DESCRIPTION OF THE INVENTION

Figure 1:
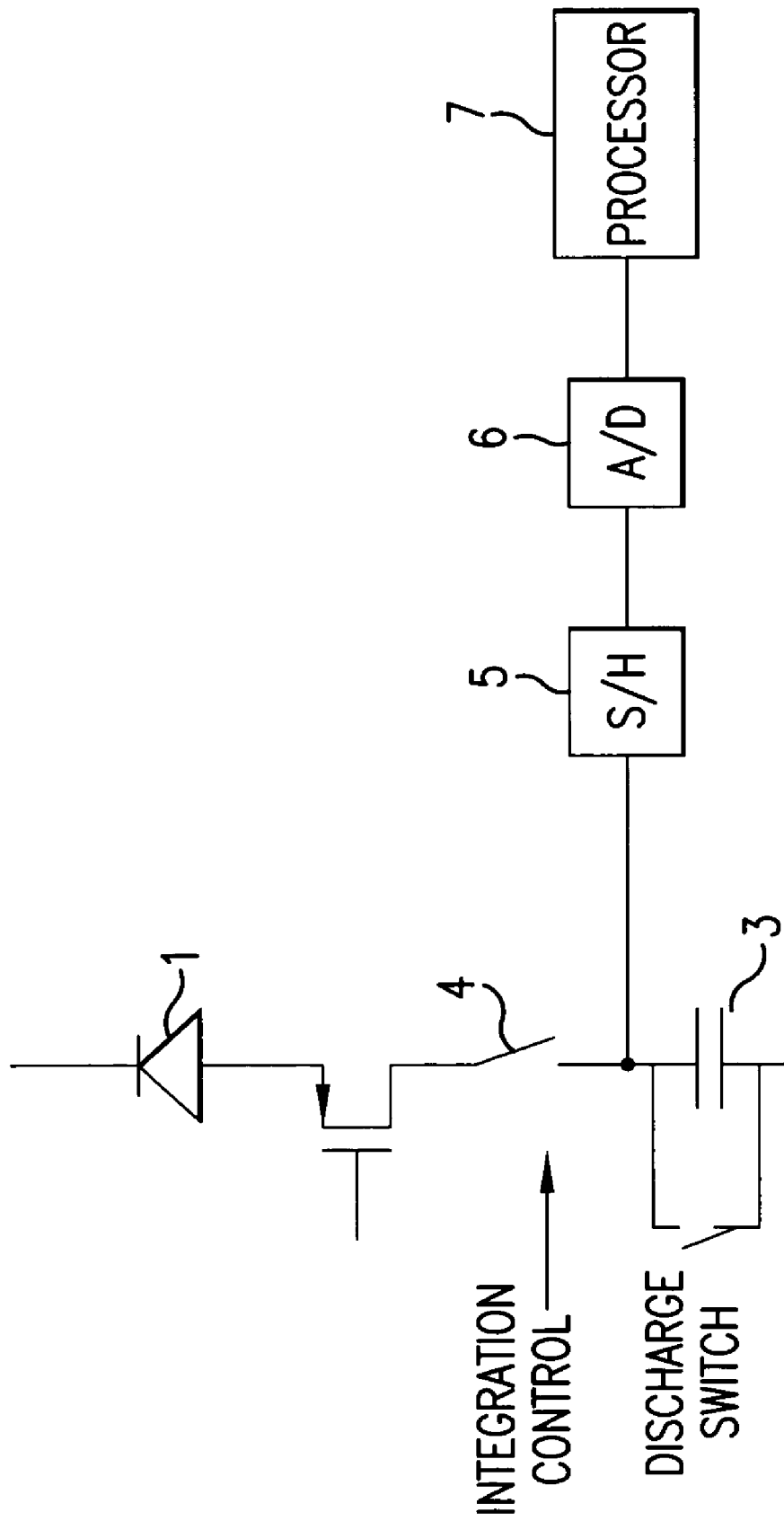
FIG. 1 is a simplified schematic drawing of a prior art photo detector of the type to which this invention applies.
Figure 2:
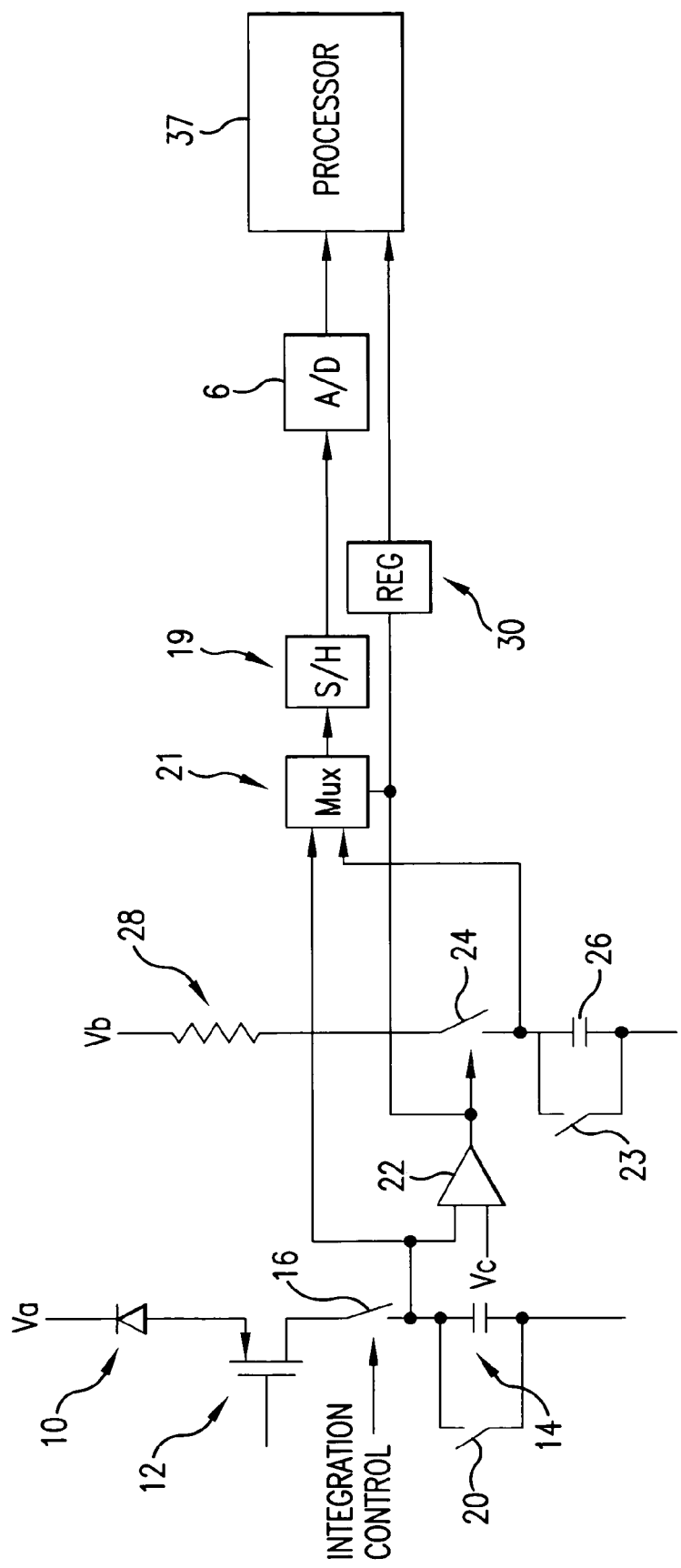
FIG. 2 is a schematic drawing of one embodiment of this invention.

Referring now to FIG. 2, this invention starts with a basic proto detector circuit of the type shown in FIG. 1. I includes, a voltage source Va, a photodiode 10, a semiconductor 12 to provide a controlled bias for the photodiode 10, and an integration well capacitor 14. A switch 16 closes at the beginning of an integration interval and opens at the end of the interval. This circuit integrates photon flux during the finite integration period to provide a measure of photo intensity. At the completion of the integration, the voltage across the integration well capacitor 14, which is a function of the charge contained on the capacitor, is transferred to a readout sample and hold circuit 19 via a multiplexer 21. A switch 20 zeros the charge on the capacitor 14 and a switch 23 zeros the charge on capacitor 26 in preparation for the next integration cycle. This circuit can be operated with long integration times in order to maximize sensitivity for the observation of distant or dim objects. The dynamic range of the circuit is limited by the size of the integrating well capacitor 14.

So long as the brightness of an object is such that the integrating well capacitor voltage does not exceed a predetermined level during the integration interval (e.g. the well capacitor reaches saturation), the brightness of the object is within the circuit's dynamic range, and the voltage across the capacitor 14 is outputted to the sample and hold circuit 19 via a multiplexer 21. However, in certain situations, there may be other objects brighter than a distant object of interest, or the object may include both cool sections and bright sections requiring a dynamic range beyond the range of the linear well capacitor 14. To extend the dynamic range, a comparator 22 monitors the voltage on capacitor 14 and compares it to a variable reference voltage Vc. Vc is preferably set by at a common level for the all the elements of the FPA through an interface to the FPA, but could be set internally to the FPA.

Once the voltage on the capacitor 14 exceeds the reference voltage Vc, the output state of the comparator 22 changes and opens a switch 24, which is closed just at the start of each integration interval in response to the integration signal. In its closed state, switch 24 connects a voltage Vb to an auxiliary capacitor 26 through a resistor 28. The capacitance of the auxiliary capacitor 26 and the resistance of resistor 28 determine the charging rate of the auxiliary capacitor 26. The level of charge accumulated on the auxiliary capacitor 26 is a function of the time interval between the start of the integration and the time when the voltage across the integrating well capacitor 14 reaches Vc.

Upon completion of a frame interval, the state of the output of comparator 22 controls multiplexer 21 in order to determine which capacitor voltage is coupled to the sample and hold 19. If the comparator output has not changed, the voltage on capacitor 14 is sampled and held as the output. If the comparator output changes, the voltage on capacitor 26 is sampled and held as the output. A register 30 stores the multiplexer selection and is read into processor 37 along with the value in the sample and hold register 19.

The auxiliary capacitor 26 holds a charge proportional to the time to saturation of the integrating well capacitor 14 and the resulting voltage on capacitor is described in the following equations:

$$V_d = V_b\left(1 - e^{\frac{1}{RC}\left(\frac{WellSizeInPhotons}{PhotonFluxRate}\right)}\right)$$

$$PhotonFluxRate = k\frac{WellSizeInPhotons}{T_{int}} \quad \text{where } 1 < k < 10$$

$$V_d = V_b\left(1 - e^{\frac{1}{RC}\left(\frac{T_{int}}{k}\right)}\right) \quad \text{where } 1 < k < 10$$

Figure 3:
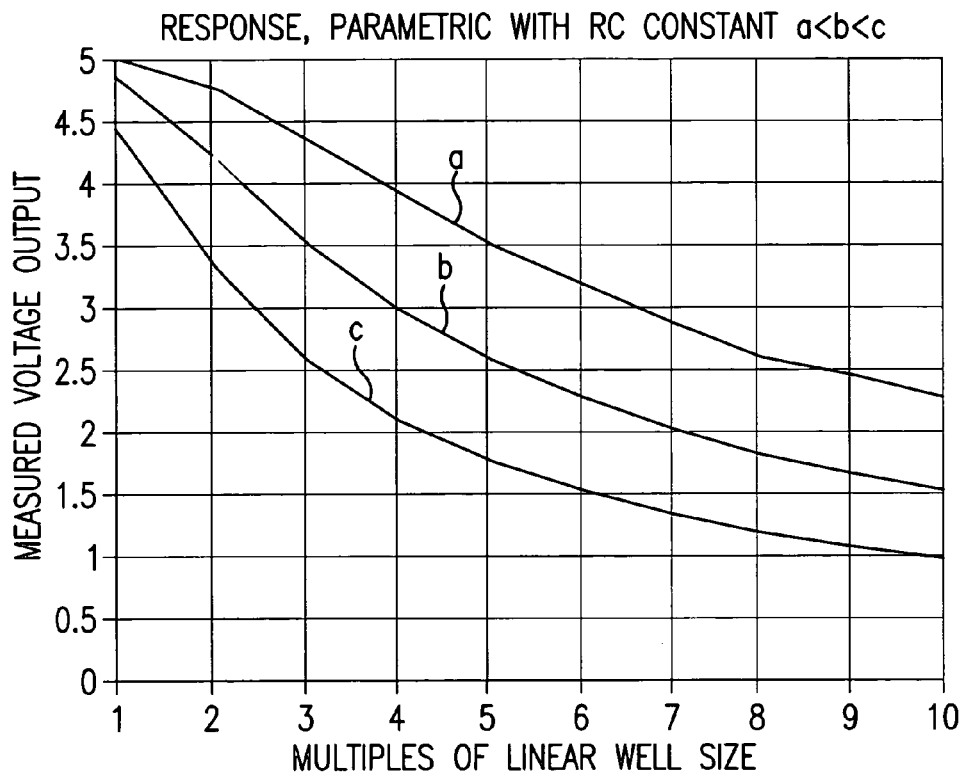
FIG. 3 is a chart illustrating the relation of voltage across the auxiliary capacitor and well fill as a function of the rate at which the auxiliary capacitor is charged.

Assuming a frame period and integration time interval of 10 milliseconds, and a Vb of 5 volts, FIG. 3 shows the relationship between the voltage across the auxiliary capacitor 26 at saturation of the integrating linear well capacitor 14 in terms of multiples of the linear size of the well 14 for various resistor-capacitor time constants. Here it will be appreciated that as the flux level incident on the photo diode 10 increases, the capacitor 14 reaches linear saturation in a smaller portion of integration interval. Nominally, the well fill time is based on a flux rate that will fill the well capacitor 14 to linear saturation at the end of the integration interval. Thus if the flux rate is ten times the rate needed to reach saturation over the entire integration interval, the capacitor 14 will reach saturation in one tenth of the integration interval. As illustrated in FIG. 3, after the switch 26 closes at the start of the integration interval, the voltage on auxiliary capacitor 26 decreases as a function of time. This voltage can be converted to the flux rate incident on the photodiode 10 based on a known flux rate needed to fill the well capacitor 14 in a known integration interval. FIG. 3 shows this relation in terms of multiples the size of the linear well 14. The smaller the RC time constant the slower the rate of voltage increase.

Figure 4:
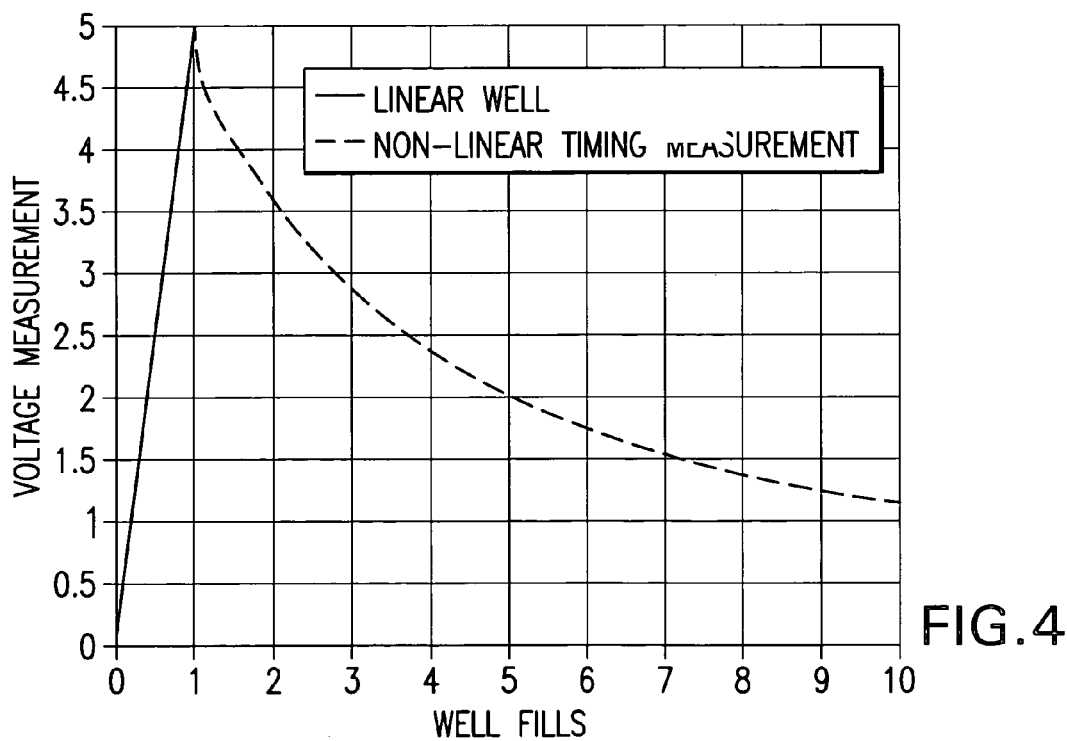
FIG. 4 is a chart comparing the linear charging rate of the well capacitor and the non-linear rate of the secondary out of range capacitor.

Assuming an RC constant of 0.004, a Vb of 5 volts, an integration time of 10 milliseconds and a 14-bit A/D converter, FIG. 4 shows an example of the voltage across the second capacitor 26 as a function of well fill.

Figure 5:
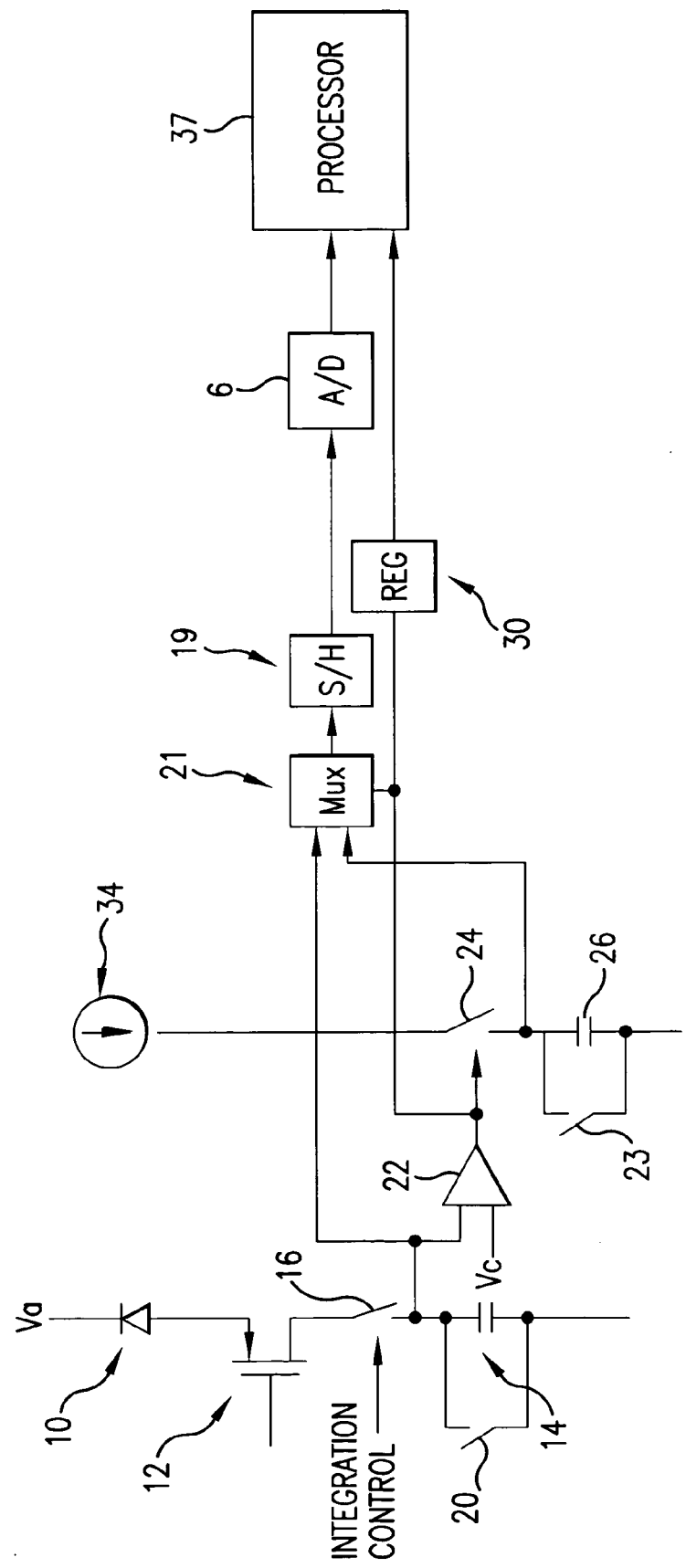
FIG. 5 is a schematic drawing of another embodiment of the invention.

Referring now to FIG. 5, the resistor 28 and voltage Vb of FIG. 2 can be replaced by a constant current source 34, with an output current i. In this embodiment the equation of the output voltage of the second capacitor is:

$$V_d = \frac{iT_{int}}{kC}$$

Figure 6:
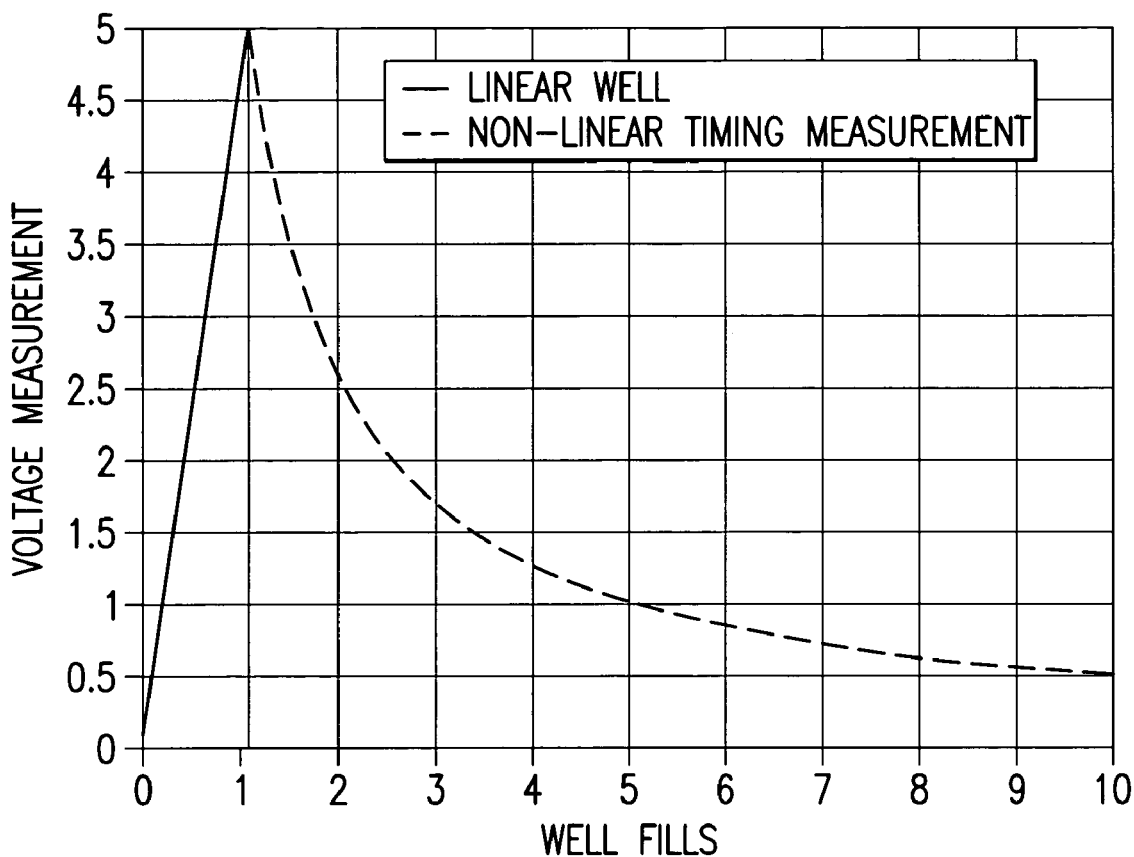
FIG. 6 is a chart similar to FIG. 4, but related to the embodiment of FIG. 5.

Assuming a capacitor of 1e-13 farads, a current of 5e-11 amperes and an integration time of 10e-3 seconds, FIG. 6 shows response of the well capacitor 14 and the auxiliary capacitor 26.

Figure 7:
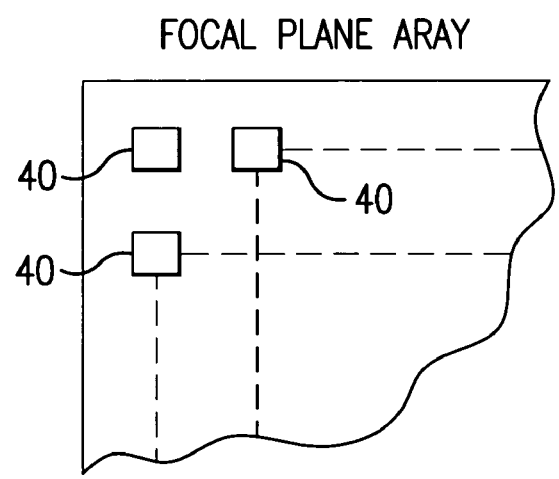
FIG. 7 is a fragmentary block diagram of a Focal Plane Array implemented with optical sensors in accordance with the teachings of this invention.

As illustrated in FIG. 7, a Focal Plane Array of detector elements 40 in accordance with the teachings of this invention is comprised of a plurality of elements in a two dimensional array of detectors, from which an image is generated. The elements of the array typically operate at the same integration interval, determined by the on time of the integration control signal.

The invention claimed is:

1. An optical sensor covering an extended range of optical input intensity, comprising in combination:
   a photo detector for generating a photo-current at a rate that is a function of the optical input intensity;
   a first integrating well capacitor;
   a switch periodically connecting said photo detector to said integrating well capacitor for a predetermined time interval;
   a second integrating capacitor;
   a source of current;
   a second switch for connecting said source of current to said second integrating capacitor at the start of the predetermined time interval;
   a reference voltage;
   a comparator for comparing said reference voltage to a voltage on said integrating well capacitor during the predetermined time interval, said comparator generating an output signal when said voltage on said integrating capacitor reaches said reference voltage;
   said output signal causing said second switch to disconnect said source of current from said second integrating capacitor; and
   means for outputting the voltage on said first integrating well capacitor if it does not reach said reference voltage during said integrating interval and outputting the voltage on the second integrating capacitor when it is disconnected from said source of current if the voltage on said first integrating well capacitor does reach said reference voltage.

2. An optical sensor as in claim 1 wherein said comparator output signal is a binary state change, and further including a register to coupled to said comparator to register said binary state at the end of said integration interval.

3. An optical sensor as in claim 1 further including a multiplexer with a data input coupled to said first capacitor, a data input coupled to said second capacitor, and a control input coupled to said comparator, and a sample and hold circuit coupled to an output of said multiplexer.

4. An optical sensor as in claim 3 wherein said comparator output signal is a binary state change, and further including a register to coupled to said comparator to register said binary state at the end of said integration interval.

5. An optical sensor as in claim 4 wherein said source of current is resistor-capacitor network.

6. An optical sensor as in claim 4 wherein said source of current is a constant current source.

7. An optical sensor as in claim 1 wherein said source of current is resistor-capacitor network.

8. An optical sensor as in claim 1 wherein said source of current is a constant current source.

9. A focal plane array covering an extended range of optical input intensity, comprising in combination:
   a plurality of photo detectors arranged in a two dimensional array;
   each of said photo detectors generating a photo-current at a rate that is a function of the optical intensity, and each of said photo detectors including;
   a first integrating well capacitor;
   a switch periodically connecting said photo detector to said integrating well capacitor for a predetermined time interval;
   a second integrating capacitor;
   a source of current;
   a second switch for connecting said source of current to said second integrating capacitor at the start of the predetermined time interval;
   a reference voltage;
   a comparator for comparing said reference voltage to a voltage on said integrating well capacitor during the predetermined time interval, said comparator generating an output signal when said voltage on said integrating capacitor reaches said reference voltage;

said output signal causing said second switch to disconnect said source of current from said second integrating capacitor; and means for outputting the voltage on said first integrating well capacitor if it does not reach said reference voltage during said integrating interval and outputting the voltage on the second integrating capacitor when it is disconnected from said source of current if the voltage on said first integrating well capacitor does reach said reference voltage.

10. An optical sensor as in claim 9 wherein said comparator output signal is a binary state change, and further including a register to coupled to said comparator to register said binary state at the end of said integration interval.

11. An optical sensor as in claim 9 further including a multiplexer with a data input coupled to said first capacitor, a data input coupled to said second capacitor, and a control input coupled to said comparator, and a sample and hold circuit coupled to an output of said multiplexer.

12. An optical sensor as in claim 11 wherein said comparator output signal is a binary state change, and further including a register to coupled to said comparator to register said binary state at the end of said integration interval.

13. An optical sensor as in claim 9 wherein said source of current is resistor-capacitor network.

14. An optical sensor as in claim 9 wherein said source of current is a constant current source.

* * * * *